United States Patent
Packard et al.

[11] Patent Number: 6,111,504
[45] Date of Patent: Aug. 29, 2000

[54] ELECTRONIC EQUIPMENT SECURITY AND RECOVERY SYSTEM

[76] Inventors: Jeffrey W. Packard, 732 Paramount Way, Brick, N.J. 08724; Donald B. Packard, 368 Ball Hollow Rd., Pulaski, Tenn. 38478

[21] Appl. No.: 09/228,959

[22] Filed: Jan. 12, 1999

[51] Int. Cl.⁷ .................................................. G08B 13/14
[52] U.S. Cl. ................ 340/568.1; 307/112; 340/571; 340/635; 340/686.1; 340/689; 340/825.34; 340/652; 361/171; 361/172
[58] Field of Search ................... 340/571, 568.1, 340/652, 686.1, 689, 635, 825.34; 361/172, 171; 307/112

[56] References Cited

U.S. PATENT DOCUMENTS

| | | | |
|---|---|---|---|
| 3,484,775 | 12/1969 | Cline | 340/538 |
| 3,781,857 | 12/1973 | Stending et al. | 340/521 |
| 4,284,983 | 8/1981 | Lent | 340/571 |
| 4,494,114 | 1/1985 | Kaish | 340/571 |
| 4,686,514 | 8/1987 | Liptak, Jr et al. | 340/568.2 |
| 4,945,341 | 7/1990 | Buttimer | 340/568.3 |
| 5,530,431 | 6/1996 | Wingard | 340/540 |
| 5,570,081 | 10/1996 | Holstrom | 340/573.3 |
| 5,675,321 | 10/1997 | McBride | 340/571 |
| 5,838,973 | 11/1998 | Lewis | 380/25 |
| 5,955,952 | 9/1999 | Bergmann et al. | 340/573.1 |
| 5,963,142 | 10/1999 | Zinsky et al. | 340/825.34 |
| 6,005,476 | 12/1999 | Valiulis | 340/310.01 |
| 6,005,935 | 12/1999 | Civanlar | 340/825.34 |

*Primary Examiner*—Glen Swann
*Attorney, Agent, or Firm*—Charles I. Brodsky

[57] ABSTRACT

The present invention describes an apparatus and method for an electronic equipment security and recovery system in which the disconnection of electrical power and subsequent movement of the equipment automatically renders the equipment inoperative. Upon obtaining the equipment from the manufacturer, and connecting it to a source of power, the owner inputs a security code into a microprocessor incorporated in the equipment, and enrolls in a security system maintained by a database provider, giving at that time the serial number designation of the equipment, the security code, and appropriate owner identification information. If the equipment were to be stolen—or simply sold or given away—, the removal of the equipment from the power source is sensed, and the equipment rendered inoperative. If the security code is not re-inputted, the then possessor of the equipment usually brings it to a servicing repair facility where, with manufacturer instructions, the serial number designation can be retrieved. Where the possessor of the equipment can establish a rightful chain of title to the owner, an override control is made at the service facility to defeat the security code original inputted, in allowing a replacement code—unique to the then possessor—to secure the equipment anew, and begin its operation once again. If a rightful chain of title cannot be established, police authorities are contacted for the equipment to be recovered.

9 Claims, 2 Drawing Sheets

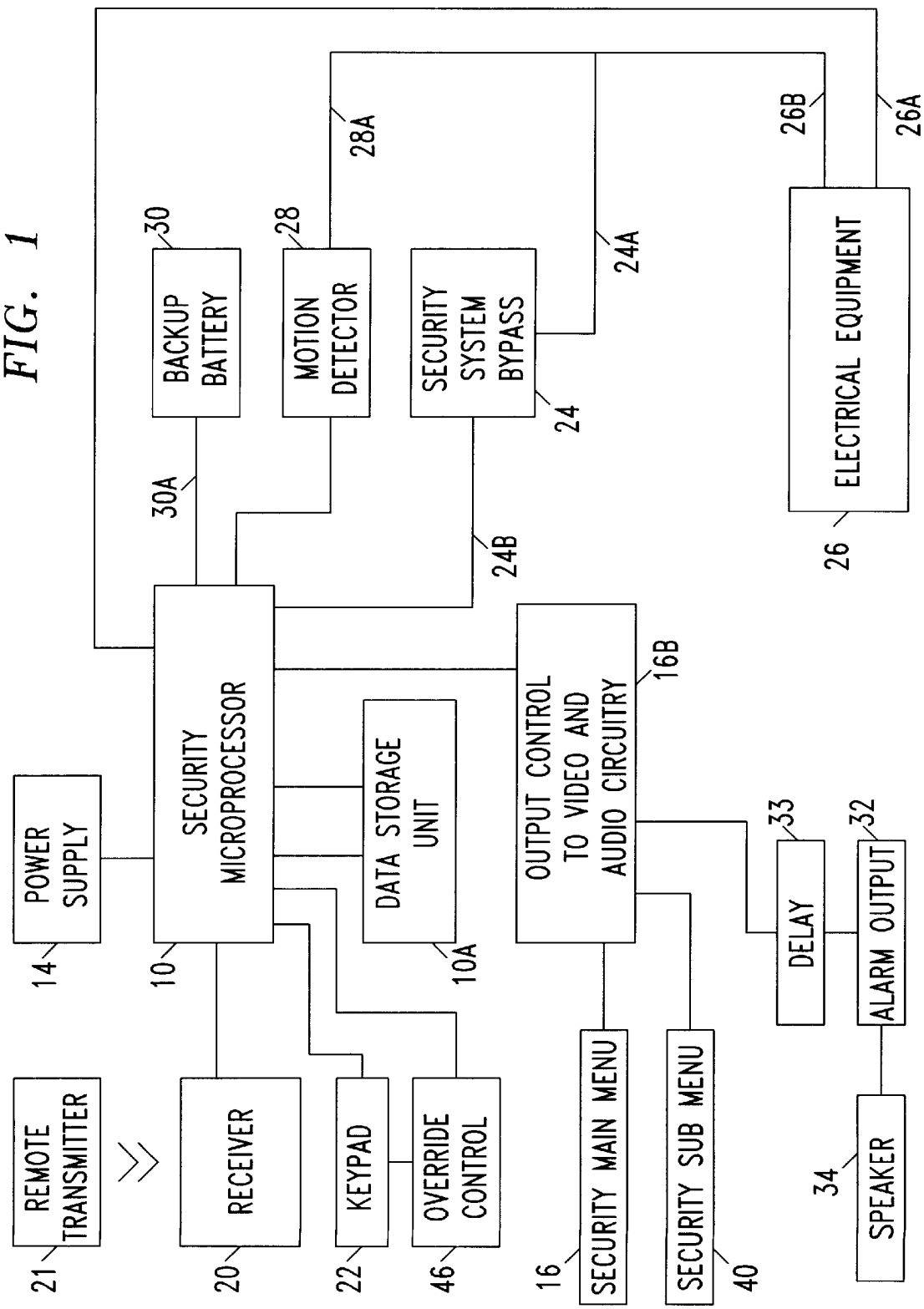

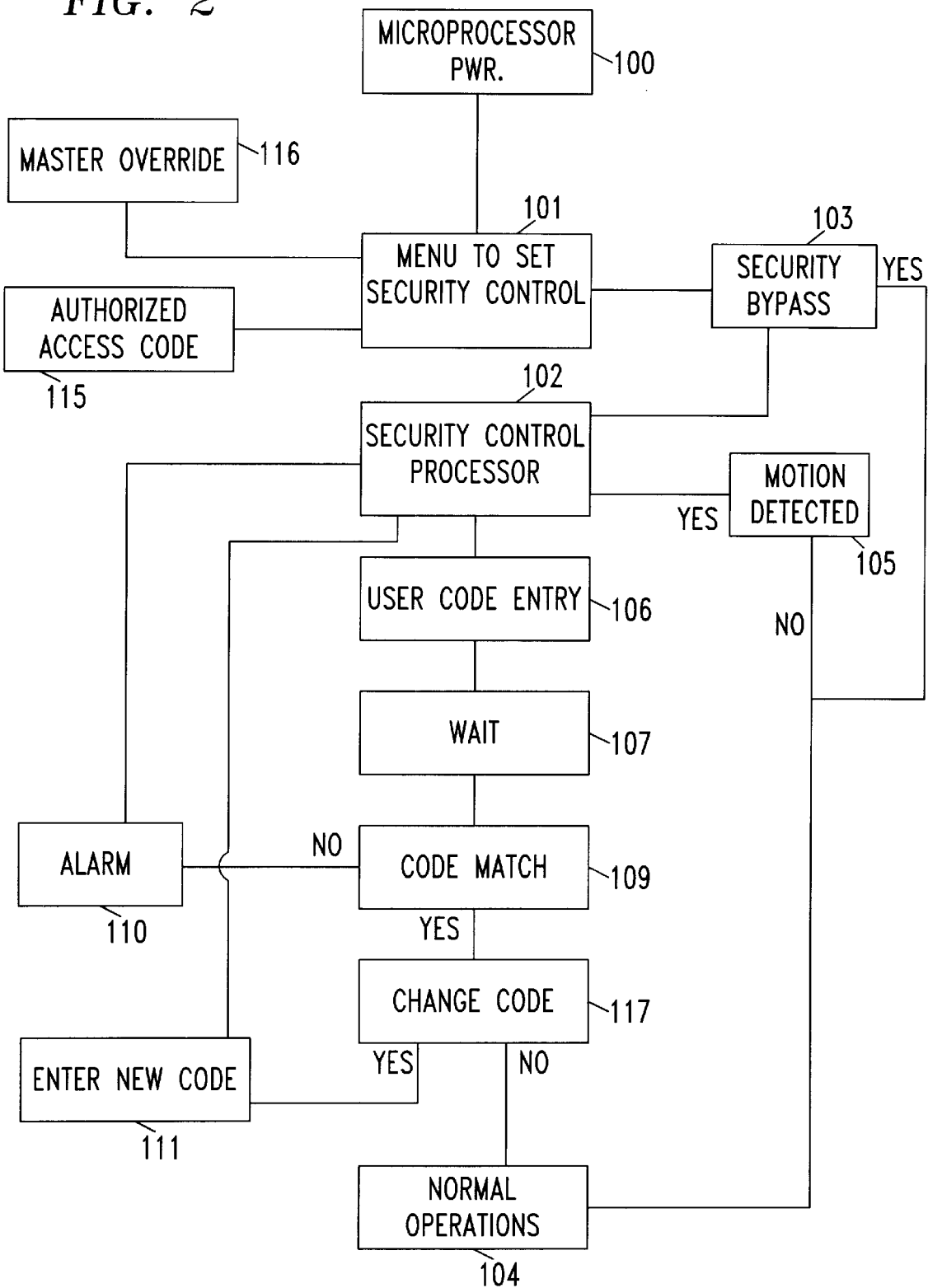

ELECTRONIC EQUIPMENT SECURITY AND RECOVERY SYSTEM

BACKGROUND OF THE INVENTION

1. Field of the Invention

This invention relates to security systems of the type which render electronic equipment inoperative after their disconnection from an electrical power source, and until a private code is inserted by the user.

2. Description of the Prior Art

Anti-theft arrangements—which render inoperative such electronic equipment as televisions, videocassette recorders, stereos, personal computers, and the like upon disconnect from an electrical wall socket and/or their being moved until an identifier reactivation code is applied—are known in the art. Typical is that security arrangement described in U.S. Pat. No. 4,494,114 (Kaish) and U.S. Pat. No. 5,530,431 (Wingard). Power plugs which disable the equipment upon removal from the electrical outlet are described in U.S. Pat. No. 3,484,775 (Cline), and in U.S. Pat. No. 3,781,857 (Stendig et al), for example. Motion detector schemes which disable the electronic equipment upon their being moved are disclosed in such places as U.S. Pat. No. 5,675,321 (McBride) and in U.S. Pat. No. 4,686,514 (Liptak et al). Alarms installed for sounding an alert in the electronic equipment when it is moved or disconnected from its power source are disclosed in U.S. Pat. No. 4,284,983 (Lent), and which sound in remote, office locations as a means of alerting of theft is shown in U.S. Pat. No. 4,945,341 (Buttimer).

Although commonly referred to as "anti-theft" arrangements or "theft deterrent" components and systems, such terminology really is a misnomer—since none of the configurations disclosed really prevent a determined thief from taking the electronic equipment, unless such equipment is bolted to a wall or floor in a locked, secured, or otherwise protected facility. Regardless of the manner by which the electronic equipment is rendered inoperable, and whether or not alarms sound, the fact is that the thief in 99 cases out of 100 is able to make a getaway with the stolen goods. Understandably, then, beyond the "deterrence" feature of the prior art, the overall scheme of equipment protection requires a "recovery" aspect—and something beyond merely adding a "homing" device to the equipment, which is actuated upon the disconnect from the power source, or the removal from its initial placement.

SUMMARY OF THE INVENTION

As will become clear from the following description, the present invention proceeds on the assumption that if the thief does not discard or trash the electronic equipment upon finding that it simply cannot be re-plugged into an outlet for use, the thief—or someone to whom the equipment is sold or given—will eventually bring the equipment to an appliance service center for repair. As will be seen, it is at that location where steps can be taken toward recovering the electronic equipment, or apprehending the person who brings it in for repair. As will further be appreciated, it is at that service location where other steps can be taken to reactivate the equipment in those instances where the person bringing it in is the rightful owner, but has simply forgotten the identifier code to restart it, after the equipment was rendered inoperative when it was moved. As will become clear, it is at this service center location, also, where modifications in the identifier code can be implemented, as where the rightful owner either sells or gives away the equipment to a different person who wishes to change the identifier code to something unique to that new individual. Similarly, it will be at this service center location where procedures can be implemented when the rightful acquirer of that equipment is not provided with the identifier code at the time the electronic equipment is transferred over.

BRIEF DESCRIPTION OF THE DRAWINGS

These and other features of the present invention will be more clearly understood from a consideration of the following description, taken in connection with the accompanying drawings, in which:

FIG. 1 is a block diagram helpful in an understanding of the security and recovery system of the invention; and FIG. 2 is a flow diagram illustrating the operation of the invention.

DETAILED DESCRIPTION OF THE INVENTION

Before referring to the Drawings, an overview of the operation of the security and recovery system of the invention would be helpful. In order to appreciate the advantages which follow, it is first to be understood that the manufacturer of the television, videocassette recorder, stereo, personal computer, etc. needs to program into its electronic equipments user actuated menus for setting security codes, for changing those codes and for overriding those codes, as circumstances dictate. The security code set by an owner who enrolls in a theft deterrent recovery system, is then maintained by the system operator in a master database, for checking at a later date, and compared with the code being outputted by the possessor of the electronic equipment, or by a service center into which the equipment is brought for repair. As will be appreciated, an owner of the equipment, to derive these benefits, must first avail himself or herself of the security service being provided—and, to such end, accompanying the various instructions books packed with the equipment when first sold are various advertisings of the desirability of the security and recovery system, inviting participation either by a return postcard (or other writing), or by phone-in. At that time, for a fee—either one-time or on a periodic basis—, the owner is asked for the security code (typically 4 digits) being programmed-in as a personal identifier, perhaps also along with a word, name or phrase unique to them specifically (as a manner of further identification). Thus, for this fee, the system operator would enroll in its database, for example, John Smith, of 50 Main Street, Anytown, U.S.A. as the owner of the electronic equipment, with a unique code name "Yankee Fan", and with a unique identifying code "4163" programmed into the equipment, representative of a birth date of Apr. 1, 1963. This identifying information is inputted into the database along with the designation of the electronic equipment purchased—such as a Mitsubishi projection television, Model Montana 712, having a serial number tag plate 7136.

Such designation of a Mitsubishi projection television will be appreciated to be a fictitious designation, but illustrates how a valuable investment could be provided to have an automatic, anti-theft shut down feature to render the television inoperative after its disconnection from an electrical power source and then moved—at least until the private identification code is inserted in by the owner. To this end, any of the security arrangements of the type previously noted, or others like them, could be employed in the Mitsubishi manufacture, as part of the theft prevention and recovery system. If the electrical power is disconnected, and the television then moved, those security arrangements block the set from working, even after it is plugged back in to the power source and turned-on. In accordance with those and similar prior arrangements, however, inserting the "4163" security code conditions the television to begin operating anew. This follows from a display on the television screen—"please insert security code"—when attempting to turn the set back on, or by providing an audible prompt asking for the security code insertion. Where the owner of the equipment—no matter what kind it might be—is faced with that prompt, inserting the code "4163" allows the equipment to become operative once again.

In accordance with the present invention, where the owner forgets the conditioning "4163" code, for example, a simple telephone call to the database operator allows for a retrieval of that code—by providing name and address information, by identifying the make, model number and serial plate information of the projection television in question, and by giving the unique identifying security word or phrase "Yankee Fan". Inserting the retrieved code then conditions the television to work once more. A refrigerator magnet could be provided by the database operator listing the telephone number to call if this shut-down occurs—or a display label with the telephone number to call could be alternatively provided for affixing to the set in any appropriate, visible manner.

However, it is not unusual for the owner of the electronic equipment to later either sell it or give it away to someone else. Since the transporting of it from its old location to its new location necessarily entails the disconnection of the electronic equipment in its moving, the included anti-theft security arrangements render the projection television, videocassette recorder, etc. inoperable when being plugged back into the wall socket. But, with the original owner providing this rightful new acquirer of electronic equipment with the appropriate conditioning "4163" security code, its insertion by the new owner in response to the video or audio prompt enables the equipment to be turned-on, and operating anew.

On such occasions, the new owner might want to change the security code to something more personal to him, or to her, than that which is already associated in the system operator's database for the previous owner, where it is desired to continue the security service protection enrollment. For example, the new owner might wish to register his name, Richard Roe, of 1010 Broad Street, Metropolis, U.S.A., with the code name "USC Grad", and with a unique identifying code "6896", representative of a date of marriage of Jun. 8, 1996. Alternatively, the new owner, while desirous of making this change in security information, might not have been provided with the code associated with the previous owner at the time of rightful acquisition—and, might be unable to obtain such previous code data if the party from whom the electronic equipment was obtained has moved away. In either event—the first being where the equipment is operating after being electrically connected again, and the second being where the electronic equipment is not yet operative—resort, according to the invention, is to be had to an appliance service center for repair. To accomplish this, however, the service center personnel must be made aware of the various procedures established by the equipment manufacturer in probing the electronic circuitry of the equipment to ascertain the security code initially programmed in by the original owner, and to override it as desired or needed. As will be readily apparent to those skilled in the art, this can be disseminated through the advertisings of the security feature by the manufacturer, and through service manuals provided to the repair center.

Thus—and understanding that the equipment security and recovery system of the present invention is only operable when the security arrangement is activated by the owner's enrolling and signing up with the database operator of this system—, upon connecting the electronic equipment to the power source in the repair facility and turning it on, the video or audio prompt is actuated to advise the repair personnel that the equipment brought in is part of the overall security and recovery system. With this in hand, the service center personnel enters a second code to allow entry into a security sub-menu, with the entry code being obtained from the various advertisements, service and technical manuals, and other informations obtained from the manufacturer directly, or obtained by telephone to a call-in center listed in the various documents provided. Such sub-menu then provides, either by video or audio response, the identification number of that equipment—as for example the tag plate serial number 7136, for those instances where the plate is no longer attached to the equipment. (Or course, where the tag plate remains intact—as it usually would be when the person bringing the equipment to the appliance center to begin with is a rightful owner—that information is already available.) The service center, possessing that number plate information, contacts the database operator for the name and address of the last legal owner of the equipment as registered in the database, as a means of verifying the legal title of the person bringing the equipment in for repair. Upon verification of a rightful chain-of-title, and upon receipt of the appropriate fee for continued enrollment in the security and recovery system, the database operator then provides the appliance center repair personnel with a master override control to defeat the "4163" identity code previously programmed in, and how to replace it with the new identity code "6896", desired by the new owner.

In like manner, where the service center customer is able to provide an identification matching that maintained in the system database, or a direct link to the owner of the equipment registered there, such information could be confirmed to the system operator to respond to the customer directly with the override control, instead of providing it to the service center who deals with such appliances on a regular basis, and, in this manner, protect against involvement by the appliance center in a theft conspiracy to begin with. In such circumstances, the database operator would first seek out its existing registrant to ascertain for itself the legality of possession of the equipment by the repair center customer. To such end, one skilled in the art would recognize a need, on the part of all original owners, to keep the system database operator current as to their location, and to report the theft of any equipment that may have been taken. Obviously, one effective way of accomplishing this is by having enrollment charges paid on a periodic basis (upon receipt of a monthly, quarterly or semi-annual billing statement, for example).

With this understood, a manner of stolen equipment recovery will become fairly evident. Thus, with the serial number tag plate information obtained at the service center by interrogating the sub-menu—or by obtaining in similar manner the identification code initially programmed in—, the service center repair personnel would telephone the system operator to inquire whether the equipment has been reported stolen. If the answer is in the affirmative, the repair center would go no further in correcting the inoperative nature of the projection television, the videocassette recorder, computer, etc., but would place a telephone call to the local police to investigate further. Where the database operator, on the other hand, has no record of the equipment's being stolen, the police could still be called in to investigate, especially where the customer bringing the electronic equipment to the repair center does not match the person whose identity is presently enrolled in the database, and is unable to establish to the system operator's satisfaction a legal connection to the registered owner. In either instance, with the identification number embedded within microprocessor circuitry in the equipment, such database interrogation and verification system allows for the recovery of the equipment at the service center locale.

With this overview of the security and recovery system's operation understood, a review of the block diagram of FIG. 1 and flow diagram of FIG. 2 would be helpful in appreciating the advantages offered, and the objects attained. Thus, in the block diagram of the anti-theft security and recovery system, reference numeral 10 identifies the microprocessor or central processing unit for the system, with its power supply and regulator shown at 14. The menu initially asking for the entry of the owner's security code and identification information into the processor 10 at start-up is shown at 16, and may be entered at 18 by a receiver 20 directly at the television, videocassette recorder, computer, etc., or by a keypad 22. A bypass 24 is indicated, for use where the owner initially elects not to enter a security code (as when not enrolling in the database anti-theft system to begin with), in which case the television, videocassette recorder, computer, etc. operates in a conventional way, as an unprotected electrical component, as at 26. The menu at 16 may be in the nature of a video prompt or audio prompt, in any appropriate manner, and appears when the electrical equipment is first turned-on, out-of-the box.

The tilt control for detecting electrical power disconnect and equipment moving is indicated at 28, together with its own battery backup 30. Where only electrical power is lost, with no physical movement of the equipment, subsequent return of power to the line provides a data output signal at 28*a*, which automatically resumes the operation of the protected equipment at 26*a*, without having to reinsert any identity code. On the other hand, a signal is outputted to the central processing unit 10 to lock it from operation when the tilt control 28 detects that the electronic equipment has been moved, as at 28*b*. Any appropriate manner of developing this lock-out signal may be employed. Where desired, an audio alarm feature could be incorporated, as well (as at 32), for actuating a speaker 34, either at a local or remote site, upon detection of the equipment move after power disconnect, as developed at 28*c*.

Reference numeral 40 represents a sub-menu coupled to the central processing unit 10, similarly allows entry of security code and customer identification information, again either directly at the receiver, or by means of a remote keypad. Upon receipt of the tilt lock-out signal at 28*c*, the television, videocassette recorder, computer, etc. is switched to its disabled condition, as at 26*b*, and a menu display is produced by the central processing unit 10 when the electrical equipment 26 is turned back on, requesting insertion of the security code by the receiver 20 or keypad 22. The audio alarm circuit 32, in this arrangement, could be provided with a time-delay 33 so as to permit inputting the security code before the audible alert is given at the speaker 34—a helpful feature where the television, videocassette recorder, etc. is being merely moved to a different location in a room. The sub-menu reference 40, on the other hand, is coupled with the central processing unit 10 for access by such authorized personnel as the service center repair technician, or by the police, for purposes of verifying identification. This accessing permits determination of the identification number of the electronic equipment where its plate information has been removed—and, in accordance with a preferred manner of security control, is intended to be embedded in integrated circuitry of the equipment at a point which is not readily accessible to separate detection by a thief. After verification that the possessor of the equipment is a rightful owner through the database confirmation, an override control for the central processing unit 10 may be entered by the service center repair people, as from 46, so as to allow updated security code and identification information to be replaced through the input sources at 20, 22. When so done, the electrical equipment 26 is once again enabled, as at 26*a*, in restarting operation. As previously noted, where a rightful chain of title cannot be established, the override control is not made at 46 to condition the equipment to begin operating anew, and contact to the local police authorities is made. Reference numeral 16B identifies an output control operative with the security menu and/or submenus in converting the digital information to a video and audible display where desired, in typical and understood manner.

This block diagram representation of FIG. 1 is easily understood in combination with the flow diagram of FIG. 2. When the television, videocassette recorder, computer, etc. equipment is first obtained and turned on, the microprocessor power at 100 conditions the menu at 101 in setting the input/output security control operation at 102, or providing the bypass 103 utilized in enabling normal operation 104, without employing the security theft features of the invention. Where no power cutoff with subsequent tilt detection is noted at 105, the continued normal set operation follows. If the tilt detection is sensed at 105, the security menu is displayed, requesting entry of the owner code 106, and allowing a time period at 107 for entry at 106 and for verification at 109. Where the code matches at 109, the enabling begins again for normal operation to follow, with or without a further security code change, at 117. Where the code at 109 is not verified, an audible alarm is given at 110, to be turned off upon entry of a new authorized code at 111, once established. The accessing of the security information at 102 is done at 115, with the override control at 116 allowing change of the security code and identification information to follow. Upon such entry of new information, the appropriate code change allows enabling of the normal operation to restart, for resultant playing.

As will be readily appreciated, once the equipment is deactivated by the tilt detection component of the system, resumed operation of the television, videocassette recorder, computer, etc. could only be had upon entry of the programmed identification code, or by entry of a new code after an override is entered from verification that the possessor is a rightful owner of the equipment in question. Where such verification is not provided, the authorized service center personnel merely reports the matter to the police authorities for further investigation—ultimately, leading to a recovery of the stolen merchandise.

While there has been described what is considered to be a preferred embodiment of the present invention, it will be readily appreciated by those skilled in the art that modifications can be made without departing from the scope of the teachings herein. For example, the security menu at 16 in FIG. 1 could also prompt the owner of the electrical equipment to enter name and address information to be stored in memory and accessible to the servicing repair center shop; suspicions would then arise when the information provided by the customer to the center does not match—and the monitoring station could then be called or the proper authorities contacted to determine true ownership, and to increase the chances of recovering stolen items. At the same time, it will be noted that the owner's security code and identification information could alternatively be entered, in FIG. 1, by a remote transmitter 21 operating in conjunction with an infrared receiver in the television, videocassette recorder, etc. Also, besides the advantages offered by the security and recovery system of the invention, a method will be seen to be set forth for carrying out the steps employed to retrieve the electrical equipment once taken. For at least such reasons, therefore, resort should be had to the system claims and to the method claims appended hereto for a true understanding of the scope of the invention.

What is claimed is:

1. A system for securing electrical equipment of a given serial number designation and for the recovery of such equipment if stolen, comprising:
   a microprocessor within said electrical equipment controlling its operation and provided with said serial number designation by the manufacturer thereof;
   a data entry device inputting a security code into said microprocessor when said electrical equipment is first obtained and power is applied;
   a database of inputted security codes and owner provided identification information corresponding to the serial number designation for each such equipment in the system;
   a motion detector for sensing a disconnection of such operating power to said electrical equipment and for developing a control signal upon further sensing of a physical movement of said equipment;
   first means coupling said control signal to said microprocessor to disable said electrical equipment in response to the further sensing of said physical movement;
   second means for retrieving said serial number designation from said microprocessor; and
   third means for comparing said retrieved serial number designation and the owner identification information provided with corresponding identification information provided by the possessor of such equipment.

2. The system of claim 1, including fourth means for overriding the security code then inputted into said microprocessor for enabling the replacement therewith of a different security code through said data entry device.

3. The system of claim 1 wherein said first means includes a time delay circuit for said control signal.

4. The system of claim 1 wherein said microprocessor includes an integrated circuit having said serial number designation embedded therein.

5. A method for using a computer to secure electrical equipment of a given serial number designation and for the recovery of such equipment if stolen, comprising the steps of:
   inputting the serial number designation of such electrical equipment into a microprocessor installed therein;
   inputting into the computer said serial number designation and owner identification information including a security code provided by said owner when such electrical equipment is first obtained and power is applied;
   inputting said security code into the microprocessor to condition said electrical equipment to operate;
   retrieving said serial number designation from such electrical equipment and from said microprocessor at a later date; and
   comparing the owner identification information in the computer with corresponding identification provided by the person then in possession of such electrical equipment.

6. The method of claim 5, also including notifying police authorities when said inputted owner identification information differs from said identification information provided from the person then in possession of such equipment.

7. The method of claim 5, also including overriding said inputted security code originally inputted into said microprocessor.

8. The method of claim 7, also including inputting a replacement security code into such electrical equipment.

9. The method of claim 5, wherein said retrieval step is performed at an equipment service repair facility.

* * * * *